UNITED STATES PATENT OFFICE 2,768,524
Patented Oct. 30, 1956

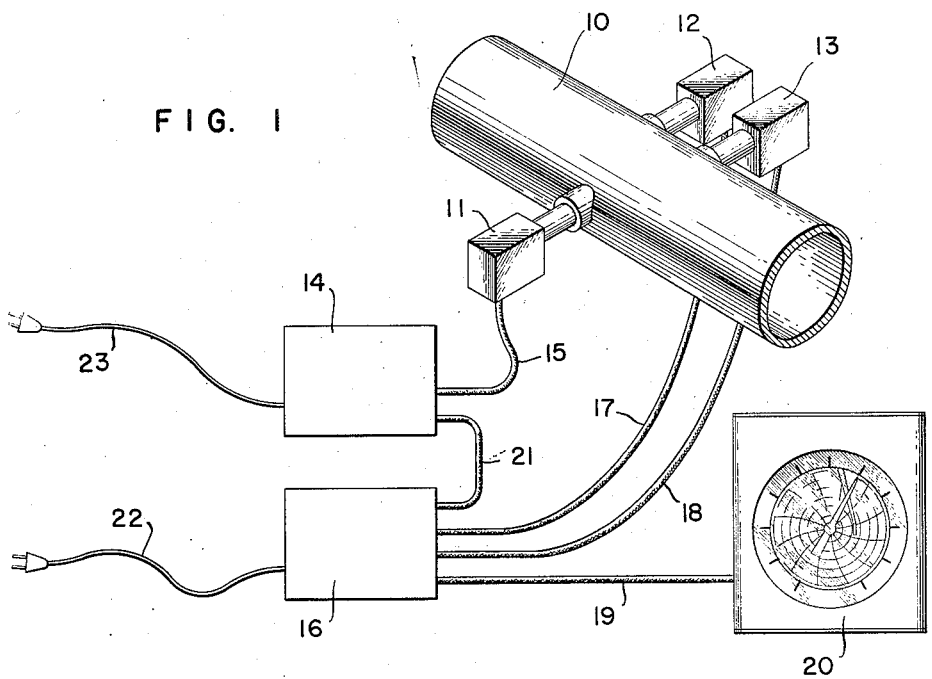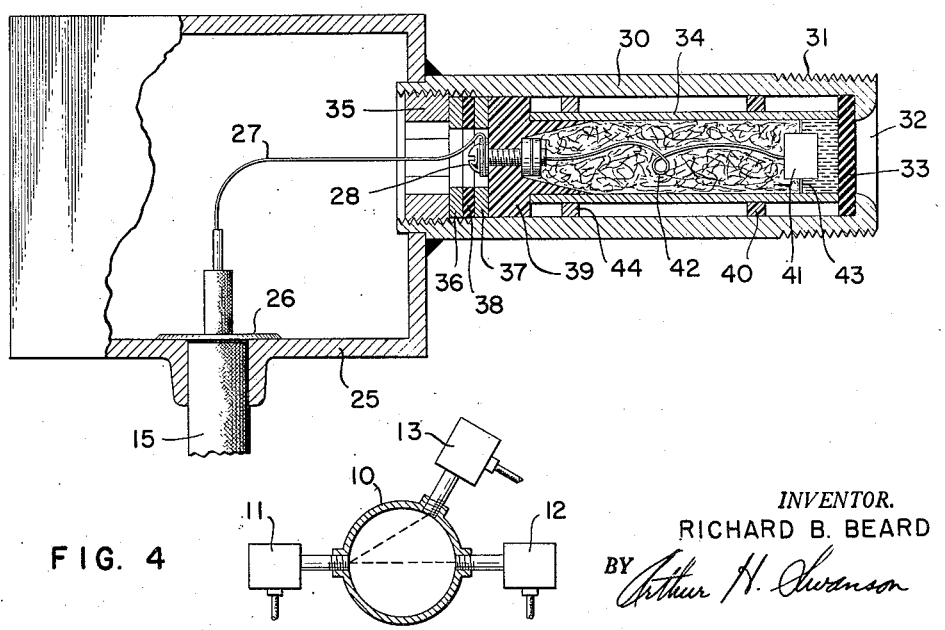

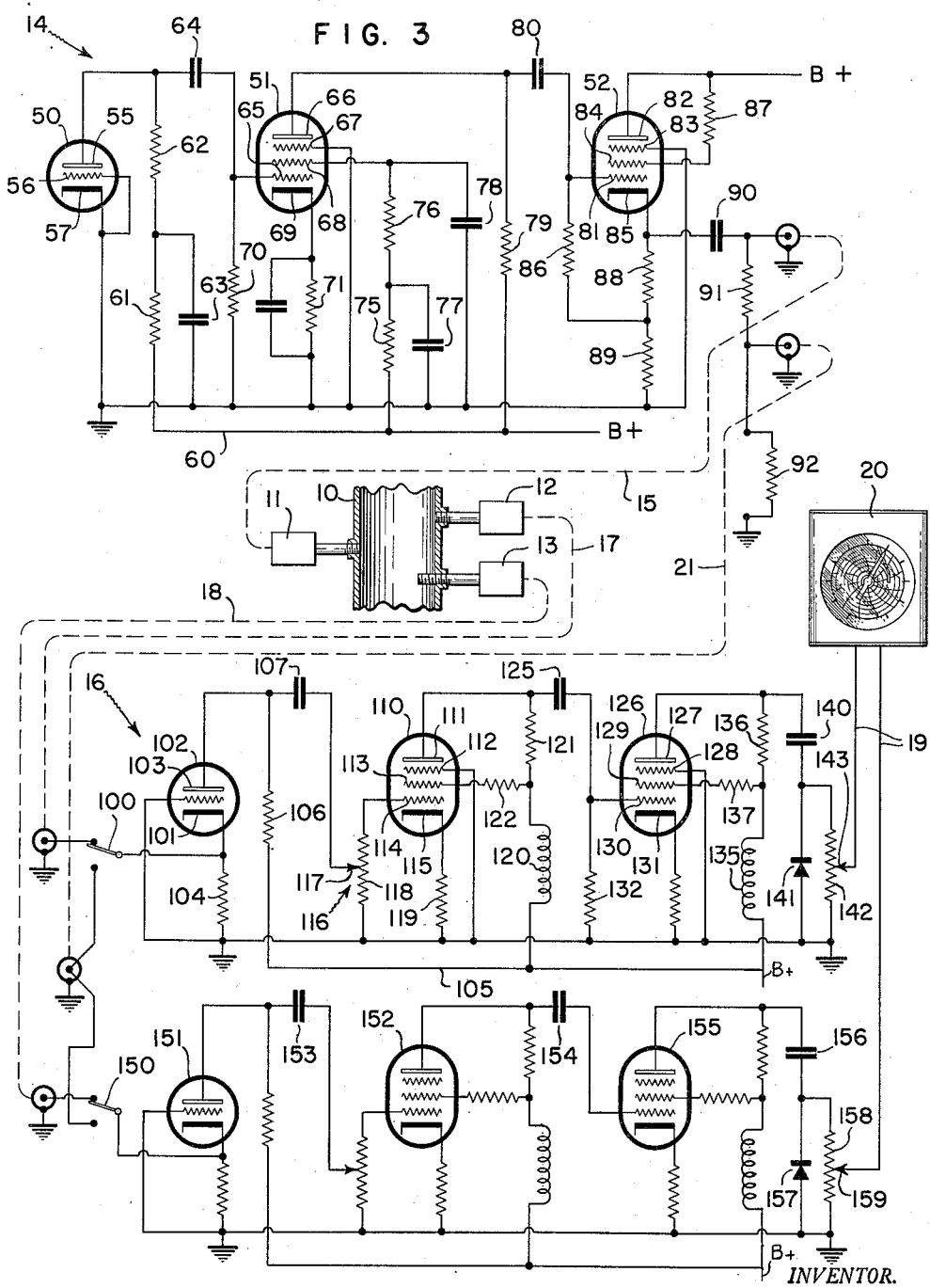

2,768,524

ULTRASONIC ABSORPTION MEASURING APPARATUS

Richard B. Beard, Philadelphia, Pa., assignor to Minneapolis-Honeywell Regulator Company, Minneapolis, Minn., a corporation of Delaware Application October 6, 1953, Serial No. 384,485

6 Claims. (Cl. 73—53)

A general object of the present invention is to provide a new and improved apparatus for measuring the absorption characteristic of a substance. More specifically, the present invention is concerned with measuring the absorption characteristic of a substance by passing mechanical wave energy signals therethrough and measuring the attenuation of the signals.

Accurate process control has as a requisite accurate knowledge of the condition or quality of the substances which go to make up the final product. Thus, in the making of paper, the maintenance of uniform consistency of the paper pulp stock used in the making of the final product is important. It has been found that it is desirable to be able to observe the condition or quality of paper pulp solution at certain points in the process. Such points are frequently located at positions wherein any large and bulky measuring apparatus of the type found in the prior art cannot be positioned without unduly interfering with the overall process. Thus, to be universally suitable for substance analysis, the measuring apparatus must be arranged so as to be able to make a measurement at any desired point along the flow line of the process without causing any interruption of the process.

It is therefore a more specific object of the present invention to provide a new and improved measuring apparatus which may be used in a process flow line without interfering with the process operation.

When mechanical wave energy is used to measure the absorption by a substance in a process, several problems arise due to the tendency for the ambient conditions of the process to vary and variably affect the measuring element of the measuring apparatus. Additional problems arise due to the tendency of the mechanical wave energy to be reflected from the sides of the space wherein the measurement is made and set up standing wave conditions which will destroy the accuracy of the measuring apparatus.

To overcome the reflection and standing wave problems in the mechanical wave energy measuring apparatus, it has been proposed to use a multi-frequency source of mechanical wave energy whose output contains sufficient frequency components to effectively cancel any standing wave conditions which might be expected to occur. The compensating for the ambient conditions which affect the mechanical wave energy devices may be accomplished by using a pair of receiver devices which respond to a different segment of the mechanical wave energy received. Thus, in the copending application of Robert C. Swengel, Serial No. 352,509, filed May 1, 1953, entitled "Measuring Apparatus," the received signal has been separated into two separate frequency components. Each frequency component is attenuated at a different degree than the other by an amount which is proportional to the absorption characteristic of the substance under examination. The present invention differs from the foregoing application in that the operation is based upon the absorption characteristic of the material under observation varying non-linearly in accordance with the distance through which the energy signal passes. Apparatus operating upon the latter principle has been found to be more sensitive to absorption change when used with certain types of substances.

It is therefore a still more specific object of the present invention to provide a new and improved apparatus for measuring the absorption characteristic of a substance by measuring the attenuation of a signal passing through the substance along paths of varying length.

Another more specific object of the present invention is to provide a new and improved apparatus for measuring the absorption characteristic of a substance wherein the apparatus includes two mechanical wave receivers positioned to receive energy from a transmitter which transmits energy through the substance by way of paths of different length.

Still another more specific object of the present invention is to provide an absorption measuring apparatus for measuring the absorption of a substance in a cylindrical pipe wherein there is provided a mechanical wave energy transmitter arranged to transmit energy directly into the pipe and a pair of mechanical wave receivers, one of which is positioned directly opposite the transmitter in the pipe and the other of which is positioned on the same plane as the transmitter and the one receiver and at a position closer to said transmitter.

A still further more specific object of the present invention is to provide a mechanical wave energy analyzing apparatus which is arranged to transmit mechanical wave energy through a substance to a pair of receivers which are differentially spaced from the transmitter in the substance wherein the receiving apparatus may be readily calibrated by connecting the transmitting means directly to the receivers.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Of the drawings:

Fig. 1 is a schematic showing of the present absorption measuring apparatus as applied to a conduit through which may be carried the substance under examination;

Fig. 2 is a representative showing of a suitable mechanical wave energy transmitter and receiver;

Fig. 3 shows a form of electrical circuit which may be used in the apparatus shown in Fig. 1; and Fig. 4 shows a modified arrangement of the transmitting and receiving apparatus used in the measuring apparatus.

Referring first to Fig. 1, the numeral 10 represents a conduit through which may be flowing a substance whose absorption characteristic is to be determined. Positioned on the left hand side of the conduit 10, as viewed in the drawing, there is positioned a transmitting transducer 11 which is capable of transmitting mechanical wave energy signals into the substance passing through the conduit 10. Positioned on the right hand side of conduit 10 opposite the transmitter transducer 11 are a pair of receiving transducers 12 and 13, both of the said receivers being of the type which are capable of receiving mechanical wave energy signals. Mechanical wave energy produced by the transmitting transducer 11 originates in the multi-frequency electrical signal source 14 which has an output cable 15 connected to supply electrical signals to the transmitting transducer 11.

The mechanical wave energy which is received by the receivers 12 and 13 is converted into an electrical signal by the respective receiving transducers and applied to a suitable electrical amplifier section 16 by way of cables 17 and 18. The output of the electrical receiver and amplifier section 16 is applied to a further cable 19 to the input of a suitable indicating and recording apparatus of any desired type. A preferred form of such apparatus is a self-balancing potentiometric apparatus of the type disclosed in the Walter P. Wills Patent 2,423,540, issued July 8, 1947.

A cable 21 is connected directly between the signal producing transmitter 14 and a receiving amplifier section 16 and is used when the apparatus is being calibrated, as will be explained below. For supplying power to the transmitting section 14, there is provided a suitable power cable 23. A power cable 22 is arranged to supply energy to the receiving section 16.

The basic operation of the apparatus of Fig. 1 is that a multiple frequency electrical signal will be produced in the section 14 and will be applied by way of the cable 15 to the transmitting transducer 11. This transducer will produce a mechanical wave energy in accordance with the applied electrical signals and the signals will be applied to the input of the conduit 10. The mechanical wave energy received by the transducers 12 and 13 will be applied by way of cables 17 and 18 to the receiving and amplifying section 16 which compares the outputs of the two receivers 12 and 13 and produces an output electrical signal which is applied to the measuring and recording instrument 20.

Fig. 2 shows a preferred form for the electrical-mechanical transducers of the present apparatus. The transmitting and receiving tranducers are substantially the same; a detailed description of the transmitting transducer 11 only will be made. As shown, the cable 15 is attached to the housing 25 with the shielding 26 of the cable 15 electrically connected to the housing 25. The center conductor 27 of the cable 15 is arranged for connection to an electrical terminal 28. Supporting the housing 25 is a cylindrical member 30 which is threaded at 31 so as to be readily engageable with cooperating threads in the conduit 10. The outer end of the member 30 has an opening at 32 which is sealed by a silicone rubber diaphragm 33. The diaphragm 33 is held in position by a further cylindrical member 34 which is forced into engagement with the diaphragm by a threaded member 35 which engages the threading on the inner surface of the cylinder 30. The threaded member 35 acts through a pair of washers 36 and 37 and a sealing washer 38 to bear against a polystyrene bushing 39. The bushing 39 serves as the mounting point for the electrical terminal 28 and also bears against the cylindrical member 34. The outer end of the cylindrical member 34 is maintained in position by a suitable plastic spacer 40 which may be in peripheral engagement with the outer surface of the cylinder 29.

Mounted within the cylinder 34 in an electro-mechanical transducer element 41. This element may take the form of any of the well known transducers presently commercially available. A transducer material which is presently very widely used is barium titanate which is capable of producing large mechanical vibrations with relatively small electrical signals. The electrical contact is made with the transducer 41 by way of the connecting wire 42 which leads from the electrical terminal 28 to the transducer 41. A further contact is made with the transducer by way of the lead 43 which is one of the supporting leads for the transducer. Lead 43 is connected to the cylinder 34 and the latter is connected to the shielding 26 of the cable 15 by way of lead short circuiting spacer 44, the cylinder 30, and housing 25.

The space in back of the transducer element 41 is filled with a mixture of castor oil and rock wool which has the effect of damping out mechanical vibrations which move in a reverse direction from the transducer 41. The space in front of the transducer 41 is filled with castor oil alone which serves to mechanically couple the transducer vibrations through the diaphragm 33 to the substance which is in contact with the diaphragm within the conduit.

The electrical signals received from the cable 15 are applied to the transducer 41 and the transducer will produce mechanical vibrations which will follow the electrical signals on the input. These vibrations appear as mechanical wave energy and are transmitted through the diaphragm 33 into the substance adjacent the diaphragm within the conduit. When the apparatus is used as a receiver, the mechanical wave energy signals are transmitted through the diaphragm 33 against the transducer 41 and the transducer 41 will in turn produce electrical signals whose frequency will be dependent upon the received frequency and its magnitude will be dependent upon the magnitude of the mechanical energy received.

The electrical circuit of Fig. 3 is a detailed showing of the electrical circuitry that may be used in the configuration shown in Fig. 1. The corresponding reference numerals have been used between the two figures in order to facilitate the consideration of Fig. 3. The electrical signal source for the electronic signal used in the transmitting transducer 11 is shown in the upper half of the drawing of Fig. 3 and may be seen to comprise the following principal components; a noise generator 50 which takes the form of a gaseous triode connected as a diode; an amplifying device 51 in the form of a pentode; and an amplifier impedance matching device 52, also in the form of a pentode. The noise generator 50 will be seen to comprise an anode 55, a control electrode 56, and a cathode 57, the latter of which is directly connected to the control electrode 56. This noise generator is characterized by its ability to produce a wide range of statistically random frequency signals which are of substantially constant magnitude with the frequency range extending from a few kilocycles to several megacycles. The electrical power for this noise generator 50 is supplied by way of a high voltage power bus 60, a filter resistor 61, and a plate resistor 62. The filter resistor 61 cooperates with a filter condenser 63 in a normal manner to eliminate fluctuations in the power supply, not shown.

The output of the noise generator is passed through a coupling condenser 64 to the input control electrode 65 of the amplifier device 51. This device 51 also includes an anode 66, a suppressor electrode 67, a screen electrode 68, and a cathode 69. A conventional grid resistor 70 is connected between the control electrode 65 and a ground terminal while the cathode 69 has a conventional biasing circuit 71 connected therebetween and ground. A voltage is supplied from the high voltage bus 60 to the screen electrode by way of a filter resistor 75 and a screen resistor 76. A condenser 77 cooperates with the filter resistor 75 in the normal manner. A condenser 78 acts as a screen by-pass condenser for the screen electrode 68. The anode voltage for the anode 66 of the device 51 is supplied by way of a plate resistor 79.

The output of the device 51 is passed through a conventional coupling condenser 80 to the input control electrode 81 of the device 52. This device will be seen to comprise an anode 82, a suppressor electrode 83, a screen electrode 84, and a cathode 85. Connected to the control electrode 81 is the conventional grid resistor 86 while connected to the screen electrode 84 is a screen voltage dropping resistor 87. A pair of output resistors 88 and 89 are connected between the cathode 85 and ground with the upper terminal of the resistor 88 serving as the output terminal for the apparatus. This particular stage serves as an impedance reducing stage so that the output of the apparatus is matched to the characteristic impedance of the cable 15. A coupling condenser 90 is connected between the cathode 85 and the input to the cable 14. A further resistor 91 and a resistor 92 act as a voltage divider with the junction thereof being connected to the cable 21. This voltage divider provides the means for reducing the output signal applied to the cable 15 as will be understood upon considering the operation of the apparatus explained below.

The electrical signal on the cable 15 is transmitted to the transducer 11 where the signal is converted into mechanical vibrations which follow the applied electrical signal. These mechanical vibrations are transmitted through the pipe 10 and applied to the receiving transducers 12 and 13. Both the receiving transducers 12 and 13 will preferably contain some impedance matching circuits for matching the outputs of the respective transducers with the respective cables 17 and 18 and these impedance matching circuits may take the form of conventional cathode follower circuits, not shown. The cables 17 and 18 are coupled to the input of the receiving and amplifying section 16.

The cable 17 comes into the receiving and amplifying device 16 by way of a measure-calibration switch 100 which, when in the upper position, connects the output of the cable 17 to the input of the receiver apparatus and when in the lower position connects the output of the calibration cable 21 into the input of the associated amplifier section. The switch 100 is connected to a cathode 101 of a grounded grid triode 102. This triode 102 comprises an anode 103, as well as the cathode 101. The cathode 101 is connected to ground by way of a resistor 104 and the high voltage for the anode 103 is supplied by high voltage bus 105 by way of a plate resistor 106.

The output of the device 102 is coupled by way of a coupling condenser 107 to the input of a pentode amplifier section 110. This pentode comprises an anode 111, a suppressor electrode 112, a screen electrode 113, a control electrode 114, and a cathode 115. The control electrode 114 is connected to the coupling condenser 107 by way of a gain control potentiometer 116 comprising a slider 117 movable over an associated resistor 118. A cathode resistor 119 is connected between the cathode 115 and ground. The high voltage for the anode 111 is supplied by way of a high frequency choke coil 120 and a resistor 121. A resistor 122 is connected to the screen electrode to supply a high voltage thereto from the anode supply connection. The electrical components of this stage are selected to transmit and amplify a wide band of frequencies with a minimum of attenuation inasmuch as the received signals from the transducer 12 include a plurality of random frequencies extending over a wide range.

The output of the amplifier device 110 is coupled by way of a coupling condenser 125 to the input of a further amplifier device 126 which amplifier device and its circuits is substantially the same as the device 110 and its circuits. Here, the device 126 comprises an anode 127, a suppressor electrode 128, a screen electrode 129, a control electrode 130, and a cathode 131. A conventional grid circuit resistor 132 is connected between the control electrode and ground and the anode is supplied by a high voltage by way of a high frequency choke coil 135 and a plate resistor 136. A screen resistor 137 serves to connect the high voltage source to the screen electrode 129.

The output of the device 126 is coupled by way of a coupling condenser 140 to a rectifier circuit which includes a rectifier 141 with the potentiometer 142 connected in parallel therewith. The potentiometer 142 has a slider 143 cooperating therewith. The slider 143 may form one of the output connections of the cable 19 which goes to the instrument 20.

The output of the transducer receiver 13 is coupled by way of cable 18 to a further switch 150. This switch, when in the upper position, serves to connect the cable 18 to the input of an amplifying triode 151. The triode 151 corresponds to the triode 102 of the receiver section immediately above. This triode in turn is coupled to a further amplifying pentode 152 by way of a coupling condenser 153. The pentode 152 and its associated circuits are effectively the same as those of pentode 110. The output of the pentode 152 is coupled by way of a coupling condenser 154 to the input of a further pentode amplifier 155. This amplifier corresponds to the amplifier 126 and its associated circuits. The output of the pentode 155 is applied by way of a coupling condenser 156 to a rectifier 157 which is connected in parallel with an output potentiometer resistor 158 having a slider 159 cooperating therewith. The slider 159 forms the other output lead for cable 19 which connects to the input of the indicating instrument 20.

In considering the operation of the apparatus shown in Fig. 3, it is assumed that electrical power is supplied to the apparatus so that there are operating voltages available for the amplifying tubes and, further, all of the cathodes of the amplifiers requiring heating are provided with suitable heating means from power sources, not shown. With power being supplied to the signal source 14, the noise generator or multi-frequency source 50 will produce a wide band of statistically random frequencies whose envelope will be of substantially constant magnitude throughout. As mentioned above, this frequency range may extend from a few kilocycles to several megacycles. The output signal from the generator 50 is applied to the input of the amplifying pentode 51 and from there to the output matching pentode 52. The output of the device 52 is at the cathode 85 and the signal is applied to the coupling condenser 90 to the cable 15 which is connected to supply the driving signal for the transmitting transducer 11. By properly matching the output of the device 52 to the input of the cable 15, there will be a maximum transmission of the electrical signal with a minimum power loss and a minimum of reflection in the cable. This electrical signal is applied to the transducer 11 which will convert the signal into mechanical vibrations which will have frequencies corresponding to the frequencies of the electrical signal generated by the noise generator 50. Inasmuch as there are a wide range of frequencies being applied to the solution within the pipe 10 these frequencies will tend to cancel each other as they are reflected from the side of the pipe and prevent the formation of standing wave conditions which will disrupt the normal measuring operation. While an apparatus of this type may be used to operate with a single frequency being passed through the solution, a successful operation of the apparatus depends upon all of the ambient conditions of temperature, pressure, and the like remaining constant. Any change in these ambient conditions will create a standing wave condition which will upset a single frequency type apparatus. For this reason, the noise source is very desirable because of its ability to eliminate the effects of reflected vibrations present within the pipe 10.

The mechanical vibrations from the transducer 11 which are transmitted through the pipe 10 are received by the transducers 12 and 13. The magnitudes of the received signals from the transducer 11 will be dependent upon the absorption or attenuation of the signal originating from the transducer 11.

The following equation is representative of the magnitude of the received signal. This equation is as follows:

$$E_x = E_0 \epsilon^{-\lambda a x}$$

where:

$E_x$ = the wave intensity received,
$E_0$ = wave energy transmitted,
$\epsilon$ = constant,
$\lambda$ = wave length of sound,
$a$ = absorption, and
$x$ = distance traveled.

The absorption coefficient is made up of several interrelated factors including viscosity, thermal conductivity, density, wave length of sound, velocity of sound, absolute temperature, thermal coefficient of expansion at constant pressure, mechanical equivalent of heat, and the specific heat at constant pressure.

In the foregoing equation it will be seen that the distance traveled by the sound wave appears as an exponential in the equation so that the intensity of the received signal will vary non-linearly by an amount dependent upon the distance traveled. Since the transducer 13 has its inner end projecting closer to the transducer 11, the intensity of the received signal will be greater in the transducer 13 than it will be in the transducer 12. The differences in intensities of the signals on the output of the two receiving transducers 12 and 13 will be applied through the respective cables to the amplifier section 16 where the individual sections associated with each transducer will amplify the received signals and produce on the output sliders 143 and 159 direct current signal potentials which will be proportional to the magnitudes of the signals received by the respective receiving transducers.

If the electrical signal from the sliders 143 and 159 are of a different magnitude, there will be an input electrical signal on the cable 19 applied to the instrument 20 and this instrument will have an appropriate output indication which may be in terms of the absorption of the substance within the pipe 10.

With a changed absorption due to a change in the substance within the pipe 10, due to the fact that the absorption coefficient is also an exponential in the above equation, the outputs of the transducers 12 and 13 will be proportionally changed. The change will be such as to produce a change in the direct current electrical potentials appearing upon the sliders 143 and 159 and the instrument 20 will be readjusted to indicate the new absorption characteristic of the substance within the pipe 10.

In order to calibrate the apparatus of Fig. 3, the switches 100 and 150 are moved to the down position so that both of the receiver sections of the receiver 16 are connected directly to the cable 21. It will be noted that the cable 21 is connected to the output of the signal generator section 14 at the junction between the resistors 91 and 92. This voltage divider is effective to decrease the output voltage applied to the cable 21 so that the voltage is of a magnitude comparable to the magnitude of the signal received from the receiving transducers 12 and 13, when these transducers are applying a signal to the input of the respective receiver sections. Since the signal on the cable 21 is applied to both of the receiver sections the outputs of the two receiver sections should be the same. If they are not the same, the sliders 143 and 159 may be appropriately adjusted until the instrument 20 indicates a predetermined value which is indicative of a balance condition within the two receiver sections of the receiver 16.

After the apparatus has been calibrated, it may be switched back to the operate position wherein the switches 100 and 150 are in the up position. Normal operation may then be resumed.

Fig. 4 shows a modified arrangement for the placement of the transmitting and receiving transducers of the apparatus. Here, the transmitting transducer is shown positioned on the left side of the pipe 10 with the receiving transducer 12 positioned directly opposite. The receiving transducer 13 is positioned above the transducer 12 in the same plane as the transducers 11 and 12. It will be readily apparent that the receiving transducer 13 is closer to the transmitting transducer 11 than is the receiving transducer 12.

The apparatus modified in Fig. 4 is particularly adapted for use in configurations where the substance flowing in the conduit 10 is moved at a very high velocity, or at velocities which may vary over wide ranges. If the transducers are in the same cross sectional plane of the pipe 10, these velocity effects are substantially eliminated and the output readings of the apparatus will still be indicative of the absorption characteristic of the substance within the pipe.

While a specific arrangement of the transducer shown in Figs. 1 and 4 has been shown, these showings have been illustrative only as it will be obvious that there are many other possible arrangements for positioning the transducers of the apparatus. Further, the electrical circuitry shown in Fig. 3 has been for illustrative purposes only as there are obviously many circuit configurations which would accomplish the same end result as the apparatus shown.

While, in accordance with the provisions of the statutes, there has been illustrated and described the best forms of the embodiments of the invention known, it will be apparent to those skilled in the art that changes may be made in the form of the apparatus disclosed without departing from the spirit of the invention as set forth in the appended claims and that in certain cases, certain features of the invention may be used to advantage without a corresponding use of other features.

Having now described my invention, what I claim as new and desire to secure by Letters Patent is:

1. In apparatus for measuring the absorption characteristic of a material to mechanical wave energy, the combination comprising, a mechanical wave generator arranged to transmit wave energy through said material, a pair of mechanical wave receivers positioned in a predetermined position relative to said wave generator to receive the wave energy transmitted by said generator after the wave energy has been transmitted through said material and attenuated in accordance with the absorption characteristic of said material, said wave receivers being displaced unequal distances from said generator, and measuring means connected to said pair of receivers for comparing the wave energy received by said pair of receivers for obtaining a measure of the absorption characteristic of said material.

2. Apparatus for determining the absorption characteristic of a material comprising, a mechanical wave generator arranged for transmitting wave energy through the material, a pair of mechanical wave receivers arranged to be positioned in a predetermined position relative to said material and said wave generator so as to receive wave energy transmitted by said generator through said material, said receivers being displaced unequal distances from said generator, and signal comparison means connected to said receivers with the difference between the magnitude of the wave energy received by said receivers being indicative of the absorption characteristic of the material.

3. Apparatus for determining the absorption characteristic of a material in a cylindrical pipe comprising, a mechanical wave generator arranged for connection to the pipe for transmitting wave energy therein, first and second mechanical wave receivers positioned in said pipe to receive wave energy from said mechanical generator, one of said receivers being positioned closer to said mechanical generator than the other, and signal measuring means connected to said first and second wave receivers for comparing the magnitudes of the wave energy received by said first and second wave receivers to determine the absorption characteristic of the material.

4. Apparatus for determining the absorption characteristic of a material in a cylindrical pipe comprising, a mechanical wave generator arranged for connection to the pipe for transmitting wave energy therein, a first mechanical wave receiver positioned effectively opposite said generator in said pipe, a second mechanical wave receiver so positioned in said pipe as to be displaced from said generator a distance less than the distance of said first receiver, said generator and first and second mechanical wave receivers being positioned circumferentially in the same plane with respect to a cross section of said pipe, and wave amplitude comparison means connected to said first and second receivers.

5. An electro-mechanical apparatus for measuring an absorption characteristic of a material comprising, a multi-frequency source of energy, an electro-mechanical transducer connected to said source and arranged to transmit mechanical wave energy through the material, a pair of mechanical wave receivers being positioned relative to said material and said transducer so that said receivers will have electrical outputs proportional to the amplitude of the wave energy received through the material from said transducer, said receivers being displaced unequal distances from said transducer, and circuit means connected to said receivers to compare the amplitudes of the outputs thereof to obtain an indication of the absorption of the material.

6. An electro-mechanical apparatus for measuring the absorption characteristic of a material comprising, a multi-frequency source of energy, an electro-mechanical transducer connected to said source and arranged to transmit mechanical wave energy through the material, a pair of mechanical wave receivers being positioned relative to said transducer and said material so that said receivers will have electrical outputs proportional to the amplitude of the wave energy received through the material from said transducer, said receivers being displaced unequal distances from said transducer, circuit means connected to said receivers to compare the amplitudes of the outputs thereof to obtain an indication of the absorption of the material, means including switch means for connecting said electro-mechanical transducer directly to said pair of receivers, and means for adjusting said receivers so that when said switch means is connecting said electro-mechanical transducer directly to said pair of transducers, said receivers will have a predetermined output signal applied to said circuit means.

References Cited in the file of this patent
UNITED STATES PATENTS

| | | |
|---|---|---|
| 2,480,646 | Grahau | Aug. 30, 1949 |
| 2,527,208 | Berry et al. | Oct. 24, 1950 |

OTHER REFERENCES

Journal of Scientific Instruments, May 1951, vol. 28, No. 5, pp. 129–132, by H. R. Clayton et al.